United States Patent
Barto (10) Patent No.: US 9,488,511 B2
(45) Date of Patent: Nov. 8, 2016

(54) MAGNETIC FLOWMETER WITH VAPOR PERMEATION SENSOR

(71) Applicant: Rosemount Inc., Chanhassen, MN (US)

(72) Inventor: Michael Barto, Waconia, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

(21) Appl. No.: 14/502,001

(22) Filed: Sep. 30, 2014

(65) Prior Publication Data

US 2016/0091352 A1 Mar. 31, 2016

(51) Int. Cl.
*G01F 1/58* (2006.01)

(52) U.S. Cl.
CPC ..................................... *G01F 1/584* (2013.01)

(58) Field of Classification Search
None
See application file for complete search history.

(56) References Cited

U.S. PATENT DOCUMENTS

| | | | |
|---|---|---|---|
| 4,131,011 A | 12/1978 | Ling | |
| 4,224,565 A | 9/1980 | Sosniak et al. | |
| 4,679,442 A * | 7/1987 | Kubota | G01F 15/14 73/861.12 |
| 5,402,815 A * | 4/1995 | Hoch, Jr. | E03B 7/10 137/312 |
| 6,178,826 B1 * | 1/2001 | Graf | G01F 1/584 73/861.12 |
| 6,257,074 B1 * | 7/2001 | Kellerman | G01F 1/115 73/861.94 |
| 6,526,807 B1 | 3/2003 | Doumit et al. | |
| 6,601,460 B1 * | 8/2003 | Materna | G01F 1/40 73/861.52 |
| 6,611,775 B1 | 8/2003 | Coursolle et al. | |
| 7,290,959 B2 | 11/2007 | Beyke et al. | |
| 7,779,702 B2 | 8/2010 | Shanahan | |
| 2003/0043885 A1 | 3/2003 | Yamazaki et al. | |
| 2005/0193833 A1 * | 9/2005 | Huybrechts | G01F 1/588 73/861.12 |
| 2007/0283766 A1 | 12/2007 | Ishikawa | |
| 2009/0165866 A1 * | 7/2009 | Fima | F16K 5/0605 137/15.17 |
| 2009/0188327 A1 | 7/2009 | Shanahan et al. | |
| 2010/0107776 A1 * | 5/2010 | Shanahan | G01F 1/60 73/861.11 |
| 2010/0275701 A1 * | 11/2010 | Foss | G01F 1/58 73/861.12 |
| 2010/0288016 A1 * | 11/2010 | Basar | G01B 13/02 73/29.02 |
| 2010/0288054 A1 * | 11/2010 | Foss | G01F 25/0007 73/861.12 |
| 2010/0294024 A1 * | 11/2010 | Kumar | B82Y 30/00 73/38 |
| 2010/0294043 A1 * | 11/2010 | Magliocca | G01F 1/588 73/861.11 |
| 2011/0162459 A1 * | 7/2011 | Hobbs | G01F 1/588 73/861.15 |
| 2013/0033214 A1 | 2/2013 | Obata et al. | |

OTHER PUBLICATIONS

Written Opinion and International Search Report, for PCT No. PCT/US2015/046884, dated Oct. 29, 2015, 14 Pages.

* cited by examiner

*Primary Examiner* — Harshad R Patel
(74) *Attorney, Agent, or Firm* — Kinney & Lange, P.A.

(57) ABSTRACT

A magnetic flowmeter includes a pipe having a non-conductive liner, a field coil adjacent to the pipe and configured to generate a magnetic field across a fluid flowing through the pipe, a first electrode located in a first tunnel passing through the pipe and into the liner, and a second electrode located in a second tunnel passing through the pipe and into the liner. The electrodes are configured to sense a voltage induced by the magnetic field across the fluid flowing through the pipe. The flowmeter also includes a sealed compartment attached to the pipe and enclosing the field coil, the first electrode, or the second electrode. The flowmeter further includes a vapor sensor within the sealed compartment configured to sense relative humidity in the compartment, and an electronics compartment having transmitter circuitry connected to the field coil, the first electrode, the second electrode, and the vapor sensor.

18 Claims, 6 Drawing Sheets

MAGNETIC FLOWMETER WITH VAPOR PERMEATION SENSOR

BACKGROUND

The present disclosure relates to magnetic flowmeters, and in particular, to vapor permeation in a magnetic flowmeter.

In general, electromagnetic flow measurement techniques are applicable to water-based fluids, ionic solutions and other conducting flows. Specific uses include water treatment facilities, high-purity pharmaceutical manufacturing, hygienic food and beverage production, and chemical processing, including hazardous and corrosive process flows. Magnetic flowmeters are also employed in the hydrocarbon fuel industry, including hydraulic fracturing techniques utilizing abrasive and corrosive slurries, and in other hydrocarbon extraction and processing methods.

Magnetic flowmeters (or mag meters) measure flow by Faraday induction, an electromagnetic effect. The meter energizes a coil to generate a magnetic field across a pipe section, and the magnetic field induces an electromotive force (EMF) across the process flow. The resulting potential difference (or voltage) is measured using a pair of electrodes that extend through the pipe section and into contact with the process flow, or via capacitive coupling. The flow velocity is proportional to the induced EMF, and the volumetric flow rate is proportional to the flow velocity and flow area.

The coil and the electrode can be located in a hermetically sealed magnetics compartment in order to prevent damage to the electronics. However, a non-conductive liner lines the pipe section, and permeation of the liner can occur. In the event that permeation is occurring, vapor can build up in the magnetics compartment, increasing the relative humidity in the compartment. When the relative humidity reaches 100%, water droplets will form and can cause the magnetic flowmeter to fail due to the moisture shorting the electronics, such as the electrodes or the coil. Magnetic flowmeter failure is typically not noticeable until a short occurs and the flowmeter needs to be replaced.

SUMMARY

A magnetic flowmeter includes a pipe having a non-conductive liner, afield coil adjacent to the pipe and configured to generate a magnetic field across a fluid flowing through the pipe, a first electrode located in a first tunnel passing through the pipe and into the liner, and a second electrode located in a second tunnel passing through the pipe and into the liner. The electrodes are configured to sense a voltage induced by the magnetic field across the fluid flowing through the pipe. The flowmeter also includes a sealed compartment attached to the pipe and enclosing the field coil, the first electrode, or the second electrode. The flowmeter further includes a vapor sensor within the sealed compartment configured to sense relative humidity in the compartment, and an electronics compartment having transmitter circuitry connected to the field coil, the first electrode, the second electrode, and the vapor sensor.

A method includes sensing flow of a fluid through a pipe of a magnetic flowmeter and sensing a relative humidity in a sealed compartment with a vapor sensor. The sealed compartment is attached to the pipe and encloses at least one of a field coil, a first electrode, or a second electrode. The method further includes generating a first output representing a flow rate of the fluid through the pipe and a second output based upon the relative humidity sensed by the vapor sensor, the second output alerting a user to vapor permeation in the sealed compartment.

DETAILED DESCRIPTION

The magnetic flowmeter of the present disclosure includes a vapor sensor for detecting vapor permeation prior to flowmeter failure. The magnetic flowmeter includes a pipe section or flow tube with a pipe having an inner surface covered by a liner made of a non-conductive material. The vapor sensor senses moisture build up as water or fluid vapor permeates through the non-conductive liner into a sealed compartment containing a coil, electrodes, or both. The vapor sensor can sense a change in relative humidity in the sealed compartment. The vapor sensor is connected to transmitter circuitry circuitry in the electronics compartment of the magnetic flowmeter. The transmitter circuitry circuitry can generate an output to alert a user to permeation when the vapor sensor senses a predetermined change in relative humidity. This is advantageous as the user is alerted to permeation prior to failure of the flowmeter due to a short. The user can use the relative humidity data to estimate time to failure and replace the flowmeter prior to failure.

Figure 1:
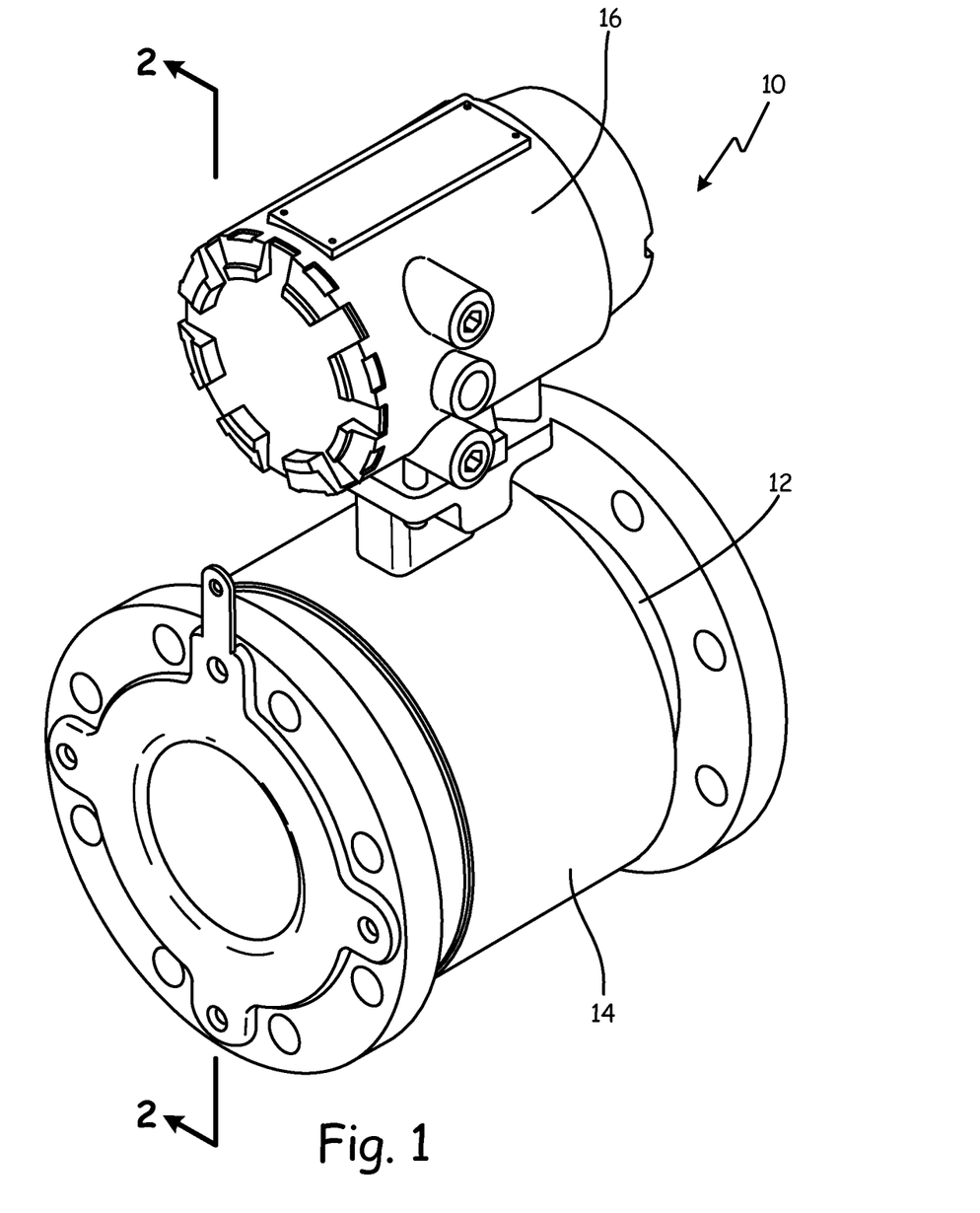
FIG. 1 is a perspective view of a magnetic flowmeter.
Figure 2:
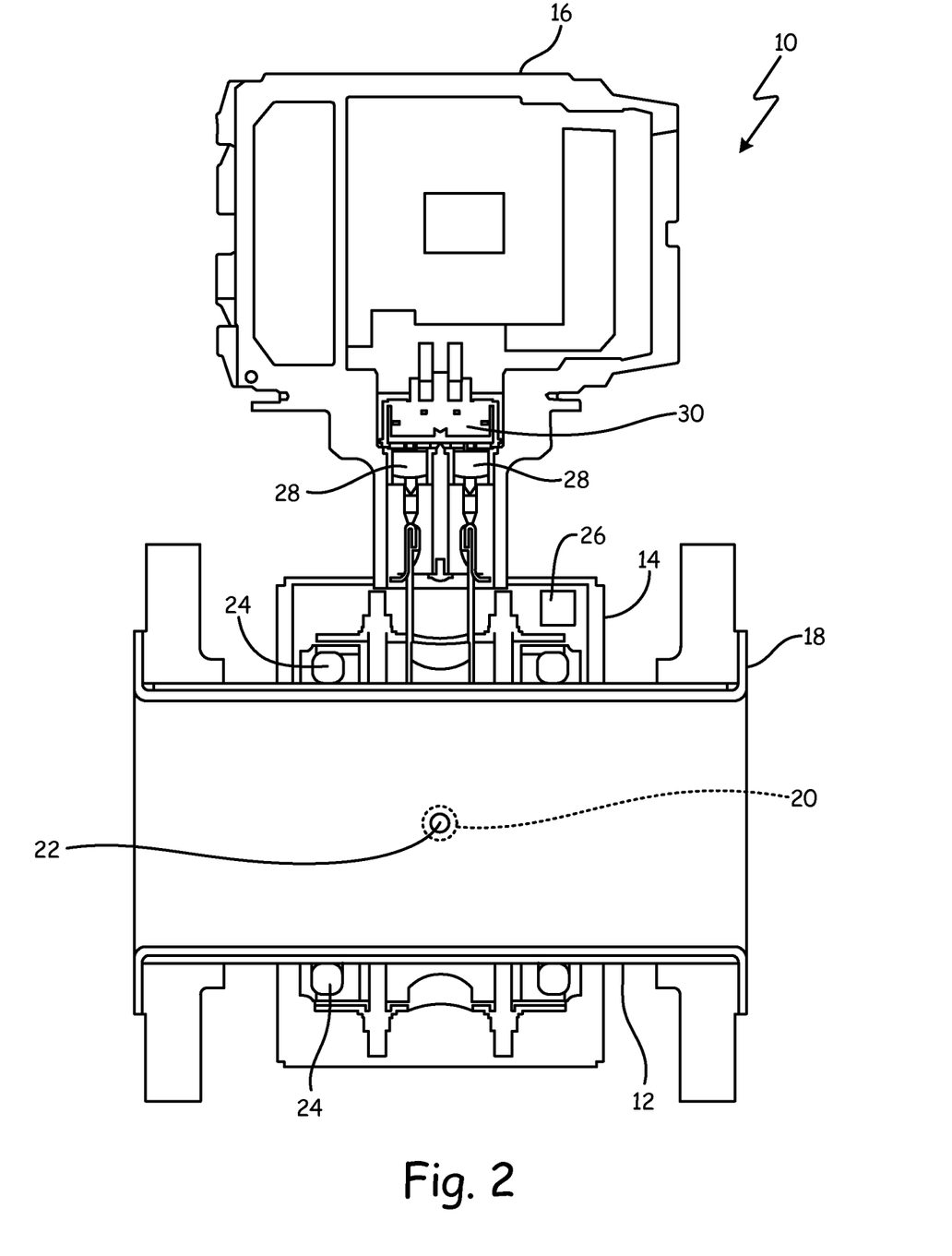
FIG. 2 is a cross-sectional view of the magnetic flowmeter of FIG. 1 along line 2-2 in FIG. 1.

FIG. 1 is a perspective view of magnetic flowmeter 10. FIG. 2 is a cross-sectional view of magnetic flowmeter 10 along line 2-2 in FIG. 1. Magnetic flowmeter 10 includes pipe 12, magnetics compartment 14, and electronics compartment 16. Pipe 12 and magnetics compartment 14 form the flow tube of magnetic flowmeter 10. The inner surface of pipe 12 is lined with liner 18. Magnetics compartment 14 surrounds pipe 12 and encloses tunnels 20 with electrodes 22, field coils 24, and vapor sensor 26. In the embodiment shown, magnetic flowmeter 10 includes two tunnels 20, two electrodes 22, and two field coils 24. Hermetic seal 28 provides a primary seal between magnetics compartment 14 and electronics compartment 16. Hermetic seal 28 can be made of glass or any other suitable material. Seal 30 provides a secondary seal between magnetics compartment 14 and electronics compartment 16. Seal 30 can be made of rubber or any other suitable material.

Pipe 12 can be made of a conductive material, such as stainless steel. Liner 18 is made of a non-conductive material such as polyurethane, polytetrafluoroethylene (PTFE), or an insulating rubber material in order to prevent a short in the voltage induced across a fluid flowing through pipe 12. Liner 18 can be glued, pressed, injection molded, or rotationally molded to the inner wall of pipe 12. In an alternative embodiment, liner 18 can be formed by pouring a material into pipe 12 and allowing the material to harden. Tunnels 20 are holes drilled through pipe 12 and into liner 18 on opposite sides of pipe 12. Electrodes 22 placed in tunnels 20, and embedded into liner 18, such that electrodes 22 are sealed against liner 18 and can be in direct electrical contact with a fluid flowing through pipe 12. Tunnels 20 provide clearance around electrodes 22, preventing electrodes 22 from contacting pipe 12 and shorting out. Field coils 24 are located opposite each other on the outside of pipe 12 (generally above and below pipe 12, as shown in FIG. 2). Vapor sensor 26 can be located anywhere within magnetics compartment 14, preferably in a location with lower temperature, such as the top portion of magnetics compartment 14 (as shown in FIG. 2).

Magnetic flowmeter 10 measures the flow velocity of a conductive fluid flowing through pipe 12 as well as vapor permeation in magnetics compartment 14. When a conductive fluid flows through pipe 12, field coils 24 generate a time varying magnetic field across the fluid. The fluid flowing through pipe 12 functions as a moving conductor inducing a voltage in the fluid. Electrodes 22 are in direct electrical contact with the fluid and therefore sense voltages present in the fluid. The voltages sensed by electrodes 22 can be used to calculate the flow rate of the fluid flowing through pipe 12.

The fluid flowing through pipe 12 can be caustic and hot. High temperature and caustic fluids can facilitate vapor permeation through liner 18. Water vapor molecules pass through liner 18 and into tunnels 20 of magnetics compartment 14. As stated above, magnetics compartment 14 is hermetically sealed; therefore the water vapor molecules build up in magnetics compartment 14 and cause an increase in relative humidity within magnetics compartment 14. Once the relative humidity reaches 100%, water droplets will form within magnetics compartment 14. The water droplets can short out the electronics within magnetics compartment 14, including electrodes 22 and field coils 24. For example, water droplets will form in tunnels 20, between electrodes 22 and pipe 12 and cause a short.

Magnetic flowmeter 10 is advantageous, because it includes vapor sensor 26 in magnetics compartment 14. Vapor sensor 26 can be a relative humidity probe or sensor, such as a microelectromechanical systems (MEMS) chip. Vapor sensor 26 can sense vapor build up, such as relative humidity, within magnetics compartment 14. The relative humidity measurement can be used to alert a user to vapor permeation in magnetics compartment 14. This allows the user to replace magnetic flowmeter 10 before a short occurs and causes magnetic flowmeter 10 to lose functionality.

Figure 3:
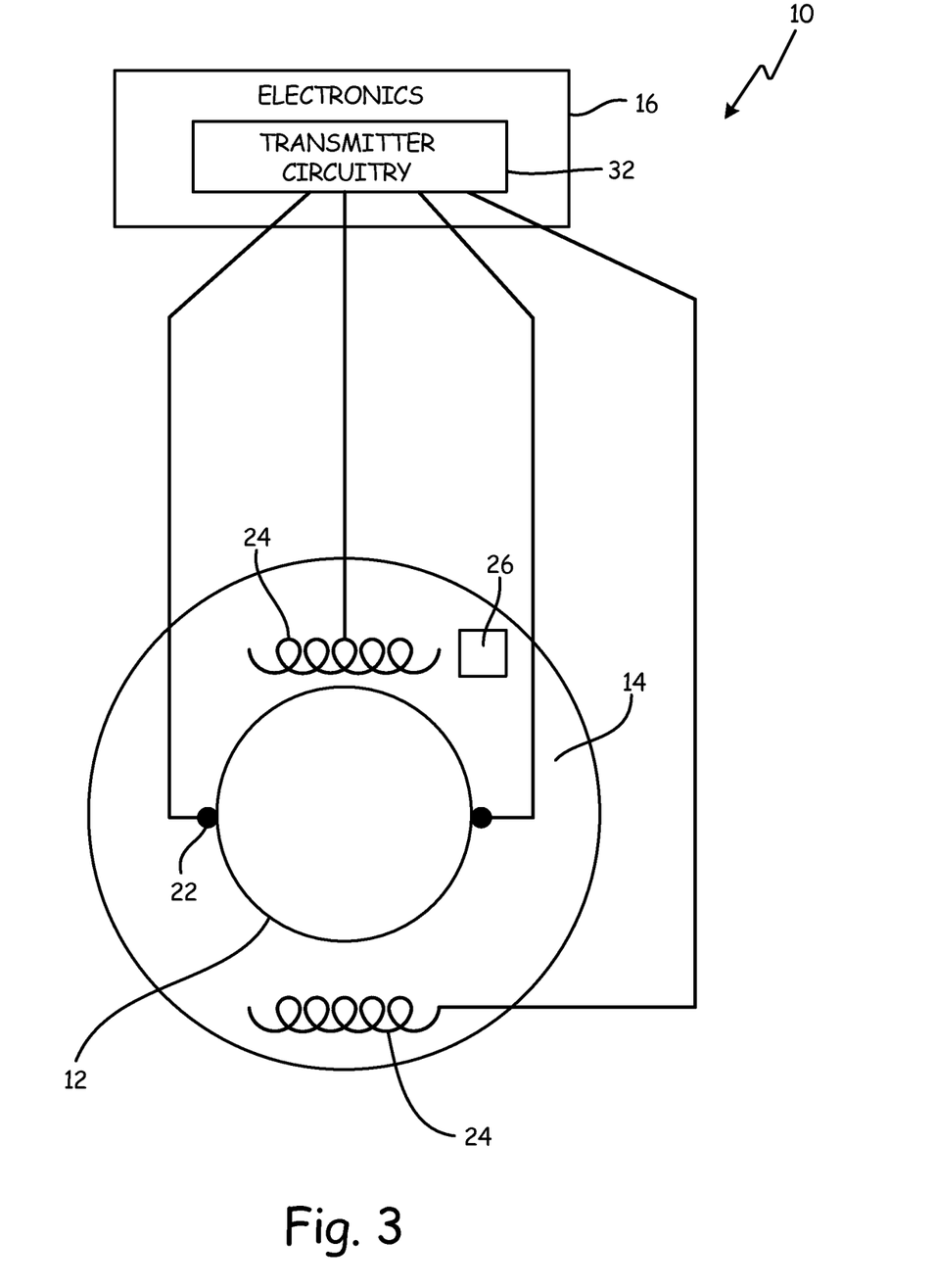
FIG. 3 is a schematic diagram of the magnetic flowmeter of FIG. 1.

FIG. 3 is a schematic diagram of magnetic flowmeter 10. Magnetic flowmeter 10 includes pipe 12, magnetics compartment 14, and electronics compartment 16. Magnetics compartment 14 encloses electrodes 22, field coils 24, and vapor sensor 26. Electronics compartment 16 includes transmitter circuitry 32. Electrodes 22, field coils 24, and vapor sensor 26 are connected to transmitter circuitry 32.

Transmitter circuitry 32 includes a coil driver, which provides power to field coils 24 in order for field coils 24 to generate a magnetic field across the fluid flowing through pipe 12. Transmitter circuitry 32 also includes a signal processor, a digital processor, and a communications interface. The signal processor measures a voltage difference in potential between electrodes 22 and converts the voltage into a digital signal representing the electrode voltage. The digital signal can be processed by the digital processor, and the digital processor supplies a flow measurement value to the communication interface, which communicates the value to a monitoring or control system. The communication interface can communicate the value through a wired connection or a wireless connection.

Transmitter circuitry 32 also receives relative humidity measurements from vapor sensor 26. The signal processor produces a relative humidity measurement sensed by vapor sensor 26 and converts the measurement into a digital signal. The digital processor can process the signal and supply a relative humidity measurement, such as a percentage of relative humidity in magnetics compartment 14, to the communication interface, which communicates the measurement to the read out or control system. The communication interface can therefore alert a user to vapor permeation in magnetics compartment 14. Additionally, the communication interface can alert the user to replace magnetic flowmeter 10 when a threshold level of relative humidity is sensed by vapor sensor 26 in magnetics compartment 14. For example, the communication interface can alert the user when a 20% change in relative humidity occurs, or when absolute relative humidity reaches a level such as 80%.

Figure 4:
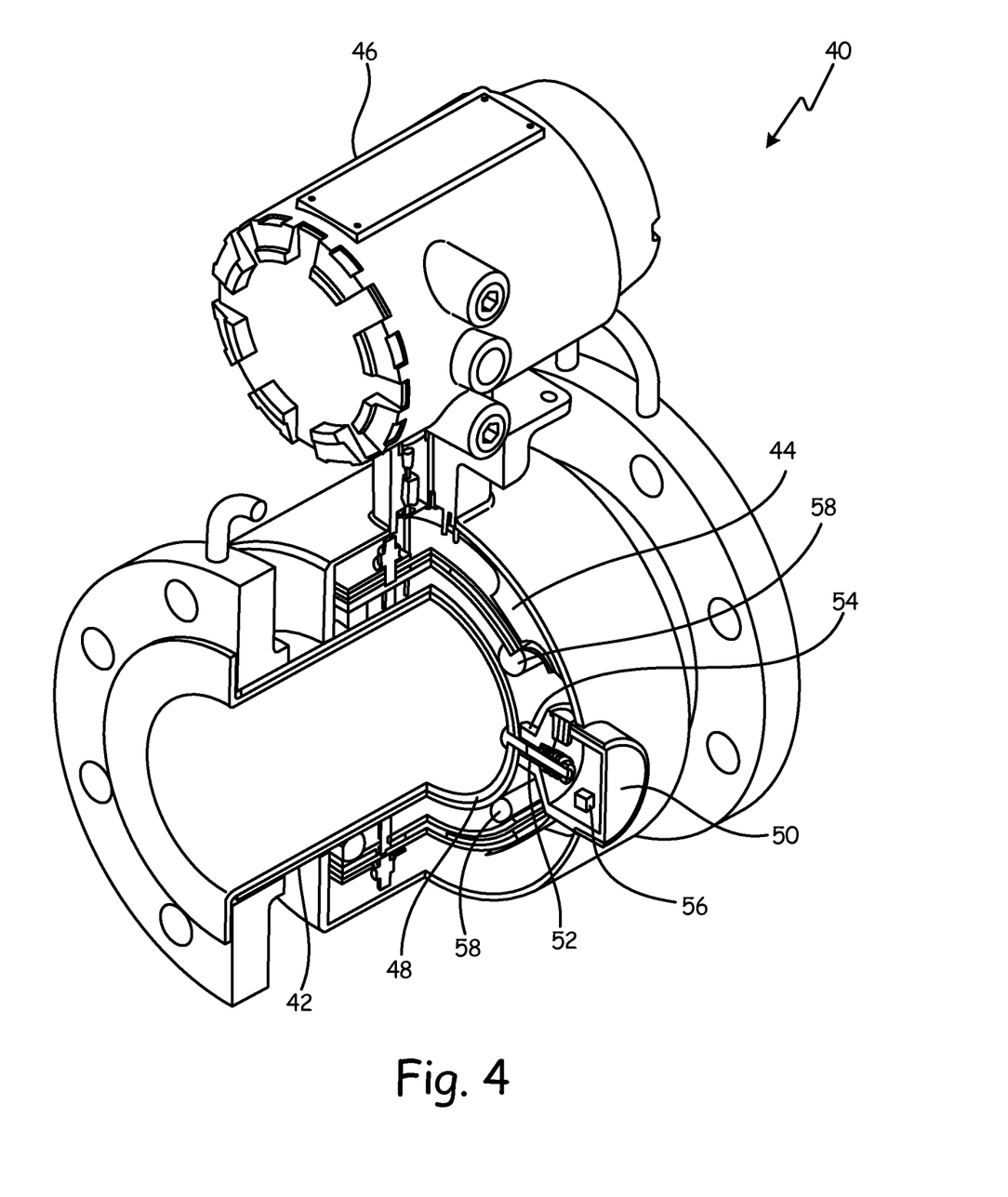
FIG. 4 is a perspective cut-away view of a magnetic flowmeter.
Figure 5:
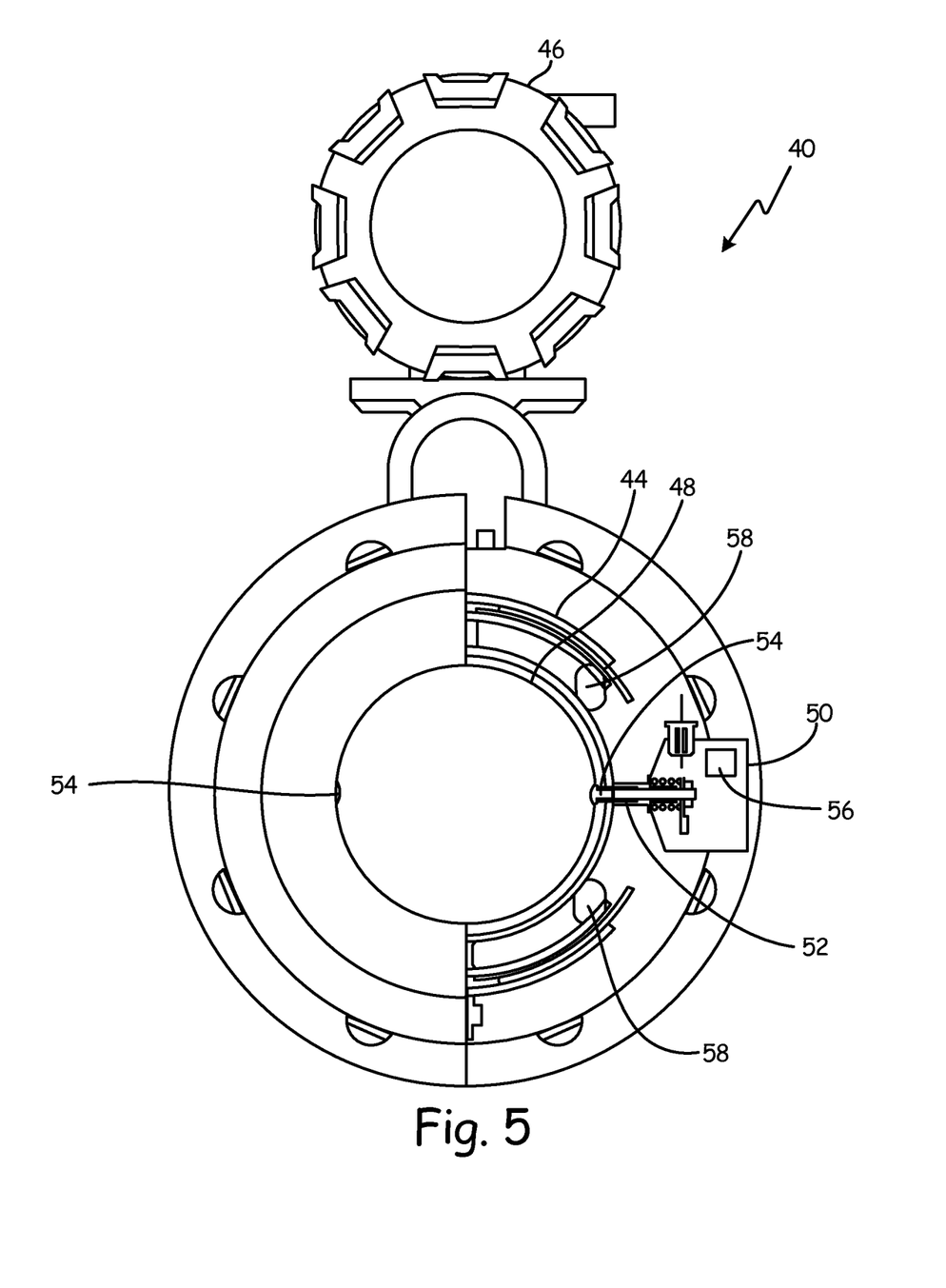
FIG. 5 is a front view of the magnetic flowmeter in FIG. 4.

FIG. 4 is a perspective cut-away view of magnetic flowmeter 40. FIG. 5 is a front cut-away view of magnetic flowmeter 40. Magnetic flowmeter 40 is substantially similar to magnetic flowmeter 10 of FIG. 1, except magnetic flowmeter 40 includes vapor sensors located in electrode wells instead of a vapor sensor located in a magnetics compartment. Magnetic flowmeter 40 includes pipe 42, magnetics compartment 44, and electronics compartment 46. The inner surface of pipe 42 is lined with liner 48. Magnetics compartment 44 surrounds pipe 42 and partially encloses electrode wells 50. Electrode wells 50 enclose tunnels 52, electrodes 54, and vapor sensors 56. Each electrode well 50 includes a tunnel 52, an electrode 54, and a vapor sensor 56. Electrode wells 50 are hermetically sealed and separate electrodes 54 from magnetics compartment 44 to prevent electrode leakage into magnetics compartment 44. Magnetics compartment 44 also encloses field coils 58. In the embodiment shown, magnetic flowmeter 40 includes two electrode wells 50, two tunnels 52, two electrodes 54, two vapor sensors 56, and two field coils 58.

Magnetic flowmeter 40 is advantageous, because it includes vapor sensors 56 in in electrode wells 50. Vapor sensors 56 can be relative humidity probes or sensors, such as MEMS chips. Vapor sensors 56 can sense vapor build up, such as relative humidity, within electrode wells 50. The relative humidity measurements can be used to alert a user to vapor permeation in electrode wells 50. This allows the user to replace magnetic flowmeter 40 before a short occurs in one of electrode wells 50 and causes magnetic flowmeter 40 to lose functionality.

Figure 6:
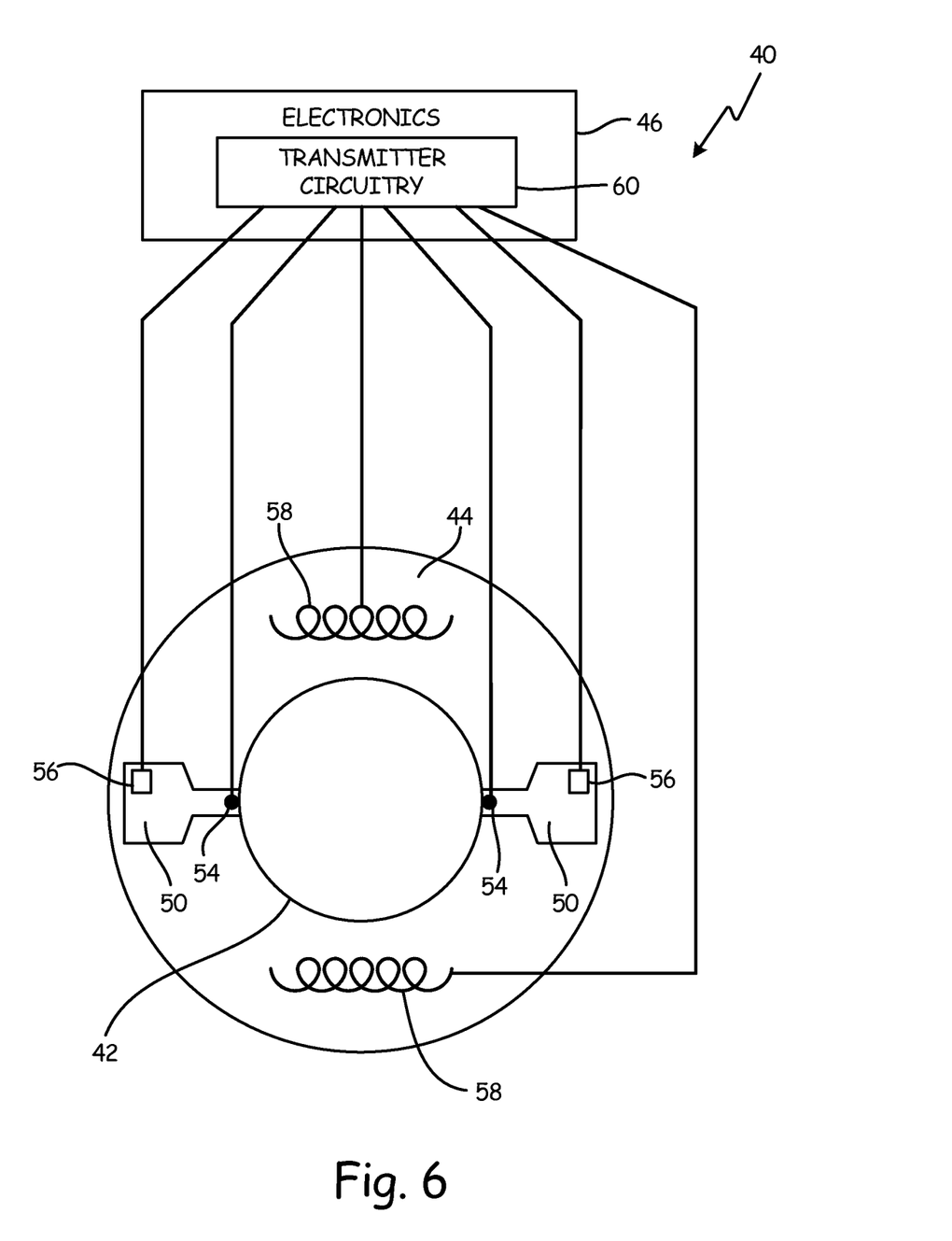
FIG. 6 is a schematic diagram of the magnetic flowmeter of FIG. 5.

FIG. 6 is a schematic diagram of magnetic flowmeter 40. Magnetic flowmeter 40 includes pipe 42, magnetics compartment 44, and electronics compartment 46. Magnetics compartment 44 surrounds pipe 42 and partially encloses electrode wells 50. Electrode wells 50 enclose tunnels 52, electrodes 54, and vapor sensors 56. Magnetics compartment 44 also encloses field coils 58. Electronics compartment 46 includes transmitter circuitry 60. Electrodes 54, vapor sensors 56, and field coils 58 are connected to transmitter circuitry 60.

Like transmitter circuitry 32 of magnetic flowmeter 10 (FIGS. 1-3), transmitter circuitry 60 includes a coil driver, a signal processor, a digital processor, and a communications interface. Transmitter circuitry 60 can process voltage sensed by electrodes 54 to generate an output representing the flow rate of the fluid flowing through pipe 42. Transmitter circuitry 60 can also process relative humidity measurements from each vapor sensor 56 in each electrode well 50 and generate outputs based upon the relative humidity sensed by vapor sensors 56. The communication interface can alert a user to vapor permeation in one or both of electrode wells 50, and can output the relative humidity percentage sensed by vapor sensors 56 in one or both of electrode wells 50. Additionally, the communication interface can alert the user to replace magnetic flowmeter 40 when a threshold level of relative humidity is sensed by vapor sensors 56 in one or both of electrode wells 50. For example, the communication interface can alert the user when a 20% change in relative humidity occurs, or when absolute relative humidity reaches a level such as 80%.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A magnetic flowmeter comprising:
a pipe having a non-conductive liner on an inner surface;
a field coil adjacent to the pipe and configured to generate a magnetic field across a fluid flowing through the pipe;
a first electrode located in a first tunnel passing through the pipe and into the non-conductive liner, and a second electrode located in a second tunnel passing through the pipe and into the non-conductive liner, the first electrode and the second electrode configured to sense a voltage induced by the magnetic field across the fluid flowing through the pipe;
a first sealed compartment attached to an outer surface of the pipe, the first sealed compartment enclosing at least one of the field coil, the first electrode, and the second electrode;
a first vapor sensor located within the sealed compartment and configured to sense relative humidity in the first sealed compartment; and
an electronics compartment having transmitter circuitry connected to the field coil, the first electrode, the second electrode, and the first vapor sensor, wherein the transmitter circuitry generates a first output representing a flow rate of the fluid as a function of the voltage sensed by the first electrode and the second electrode, and generates a second output based upon the relative humidity sensed by the first vapor sensor, the second output providing an alert indicating vapor permeation in the first sealed compartment.

2. The magnetic flowmeter of claim 1, wherein the fluid is a conductive fluid.

3. The magnetic flowmeter of claim 1, wherein the vapor sensor is a MEMS device.

4. A magnetic flowmeter comprising:
a pipe having a non-conductive liner on an inner surface;
a field coil adjacent to the pipe and configured to generate a magnetic field across a fluid flowing through the pipe;
a first electrode located in a first tunnel passing through the pipe and into the non-conductive liner, and a second electrode located in a second tunnel passing through the pipe and into the non-conductive liner, the first electrode and the second electrode configured to sense a voltage induced by the magnetic field across the fluid flowing through the pipe;
a first sealed compartment attached to an outer surface of the pipe, the first sealed compartment enclosing at least one of the field coil, the first electrode, and the second electrode;
a first vapor sensor located within the sealed compartment and configured to sense relative humidity in the first sealed compartment; and
an electronics compartment having transmitter circuitry connected to the field coil, the first electrode, the second electrode, and the first vapor sensor, wherein the first sealed compartment comprises a magnetics compartment surrounding the pipe and enclosing the field coil, the first electrode, the second electrode, and the vapor sensor.

5. The magnetic flowmeter of claim 4, wherein the first vapor sensor is configured to sense relative humidity in the magnetics compartment due to vapor permeation through the non-conductive liner into the magnetics compartment.

6. A magnetic flowmeter comprising:
a pipe having a non-conductive liner on an inner surface;
a field coil adjacent to the pipe and configured to generate a magnetic field across a fluid flowing through the pipe;
a first electrode located in a first tunnel passing through the pipe and into the non-conductive liner, and a second electrode located in a second tunnel passing through the pipe and into the non-conductive liner, the first electrode and the second electrode configured to sense a voltage induced by the magnetic field across the fluid flowing through the pipe;
a first sealed compartment attached to an outer surface of the pipe, the first sealed compartment enclosing at least one of the field coil, the first electrode, and the second electrode;
a first vapor sensor located within the sealed compartment and configured to sense relative humidity in the first sealed compartment; and
an electronics compartment having transmitter circuitry connected to the field coil, the first electrode, the second electrode, and the first vapor sensor, wherein the first sealed compartment comprises a first electrode well enclosing the first electrode and the first vapor sensor.

7. The magnetic flowmeter of claim 6, wherein the first vapor sensor is configured to sense relative humidity in the first electrode well due to vapor permeation through the non-conductive liner into the first electrode well.

8. The magnetic flowmeter of claim 7, and further comprising a second sealed compartment and a second vapor sensor connected to the transmitter circuitry, wherein the second sealed compartment encloses the second electrode and the second vapor sensor.

9. The magnetic flowmeter of claim 8, wherein the second vapor sensor is configured to sense relative humidity in the second electrode well due to vapor permeation through the non-conductive liner into the second electrode well.

10. The magnetic flowmeter of claim 9, wherein the transmitter circuitry generates the second output based upon the relative humidity sensed by the first vapor sensor and/or the second vapor sensor, the second output alerting a user to vapor permeation in the first electrode well and/or the second electrode well.

11. A method comprising:
sensing flow of a fluid through a pipe of a magnetic flowmeter;
sensing a relative humidity in a first sealed compartment with a first vapor sensor, the first sealed compartment attached to the pipe and enclosing at least one of a field coil, a first electrode, or a second electrode; and generating a first output representing a flow rate of the fluid through the pipe and a second output based upon the relative humidity sensed by the first vapor sensor, the second output alerting a user to vapor permeation in the first sealed compartment, wherein the first sealed compartment comprises a first electrode well enclosing the first electrode and the first vapor sensor.

12. The method of claim 11, wherein the first vapor sensor senses relative humidity in the first electrode well due to vapor permeation through a non-conductive liner into the first electrode well.

13. The method of claim 12, and further comprising sensing a relative humidity in a second sealed compartment with a second vapor sensor, the second sealed compartment comprising a second electrode well enclosing the second electrode and the second vapor sensor.

14. The method of claim 13, wherein the second vapor sensor senses relative humidity in the second electrode well due to vapor permeation through a non-conductive liner into the second electrode well.

15. The method of claim 14, wherein a second output is generated based upon the relative humidity sensed by the second vapor sensor, the second output alerting a user to vapor permeation in the second electrode well.

16. A method comprising:

sensing flow of a fluid through a pipe of a magnetic flowmeter;

sensing a relative humidity in a first sealed compartment with a first vapor sensor, the first sealed compartment attached to the pipe and enclosing at least one of a field coil, a first electrode, or a second electrode; and generating a first output representing a flow rate of the fluid through the pipe and a second output based upon the relative humidity sensed by the first vapor sensor, the second output alerting a user to vapor permeation in the first sealed compartment, wherein the first sealed compartment comprises a magnetics compartment surrounding the pipe and enclosing the field coil, the first electrode, the second electrode, and the first vapor sensor.

17. The method of claim 16, wherein the first vapor sensor senses relative humidity in the magnetics compartment due to vapor permeation through a non-conductive liner into the magnetics compartment.

18. A method comprising:

sensing flow of a fluid through a pipe of a magnetic flowmeter;

sensing a relative humidity in a first sealed compartment with a first vapor sensor, the first sealed compartment attached to the pipe and enclosing at least one of a field coil, a first electrode, or a second electrode; and generating a first output representing a flow rate of the fluid through the pipe and a second output based upon the relative humidity sensed by the first vapor sensor, the second output alerting a user to vapor permeation in the first sealed compartment, wherein the second output alerts the user to vapor permeation in the first sealed compartment once the first vapor sensor senses a predetermined level of humidity.

* * * * *